United States Patent [19]
Furumoto et al.

[11] Patent Number: 5,770,313
[45] Date of Patent: Jun. 23, 1998

[54] PREPREG, COMPOSITE MOLDED BODY AND METHOD OF MANUFACTURE OF THE COMPOSITE MOLDED BODY

[75] Inventors: Goro Furumoto, Moriyama; Takashi Fujiwara, Nobeoka; Tsuneo Igarashi, Moriyama, all of Japan

[73] Assignee: Asahi Kasei Kogyo Kabushiki Kaisha, Osaka, Japan

[21] Appl. No.: 709,188

[22] Filed: Sep. 6, 1996

Related U.S. Application Data

[62] Division of Ser. No. 34,171, Feb. 12, 1993, Pat. No. 5,597,631, which is a continuation of Ser. No. 582,183, Nov. 14, 1990, filed as PCT/JP90/00085, Jan. 25, 1990, abandoned.

[30] Foreign Application Priority Data

| Apr. 19, 1989 | [JP] | Japan | 1-97595 |
| Apr. 19, 1989 | [JP] | Japan | 1-97596 |
| Apr. 27, 1989 | [JP] | Japan | 1-105756 |
| Nov. 21, 1989 | [JP] | Japan | 1-300803 |
| Nov. 24, 1989 | [JP] | Japan | 1-303250 |
| Jan. 25, 1990 | [JP] | Japan | 1-14124 |

[51] Int. Cl.$^6$ .................................................. B32B 27/00
[52] U.S. Cl. .................. 428/411.1; 428/364; 428/36.91; 428/34.5; 428/413; 428/417; 428/435; 428/475.8
[58] Field of Search ............................... 428/364, 36.91, 428/34.5, 413, 417, 435, 475.8, 411.1

[56] References Cited

U.S. PATENT DOCUMENTS

| 4,868,050 | 9/1989 | Tanaka et al. | 428/435 |
| 4,892,774 | 1/1990 | Vallance | 428/364 |
| 4,954,382 | 9/1990 | Riefler et al. | 428/413 |
| 5,597,631 | 1/1997 | Furumoto et al. | 428/364 |

FOREIGN PATENT DOCUMENTS

| 2228609 | 5/1973 | France . |
| 1570000 | 6/1976 | United Kingdom . |

OTHER PUBLICATIONS

Elias, Hans–Georg, "Neue Polymere Werkstoffe 1969–1974", pp. 129–149.
Enka Information Sheet: Arenka a high tensile, high modulus aramid (1981).

Primary Examiner—Charles Nold
Attorney, Agent, or Firm—Finnegan, Henderson, Farabow, Garrett & Dunner, L.L.P.

[57] ABSTRACT

The present invention relates to a novel composite material, that is, a prepreg, obtained by bonding a film (1) comprised of an organic polymer having substantially no melting point and having a high modulus of 700 kg/mm$^3$ or more and a high strength of 35 kg/mm$^2$ or more and a resin layer (2) and/or fiber-reinforced layer (3), a composite molded body, and a method of manufacturing a composite molded body.

The composite molded body obtained by bonding the film (1) and the resin layer (2) of the present invention has superior strength, excellent pliability, and large toughness in all directions. Further, the composite molded body obtained by bonding the film (1) and the fiber-reinforced resin layer (3) has both an extremely large impact resistance which could never be obtained with conventional molded bodies and also a strength and modulus greater than in the past. The molded body can be suitably used for aerospace equipment, sports goods, leisure goods, etc. making use of its light weight, corrosion resistance, and other properties in addition to the above superior proportion.

29 Claims, 3 Drawing Sheets

PREPREG, COMPOSITE MOLDED BODY AND METHOD OF MANUFACTURE OF THE COMPOSITE MOLDED BODY

This application is a divison of application Ser. No. 08/034.171, filed Feb. 12, 1993, U.S. Pat. No. 5,597,631 which is a continuation of application Ser. No. 07/582,183, filed as PCT/JP90/00085, Jan. 25, 1990, now abandoned, which entirely incorporated herein by reference.

TECHNICAL FIELD

The present invention relates to a novel prepreg, a composite molded body obtained by forming the prepreg, and a method of manufacturing the same. More particularly, the present invention relates to a prepreg formed by laminating a high strength, high modulus film layer, resin layer, and/or fiber-reinforced resin layer, a molded body obtained by forming the prepreg and having a remarkably improved impact resistance and more isotropically improved superior strength and modulus, and, among such molded bodies, a method of manufacture of tubular or rod shaped molded bodies.

PRIOR ART

So-called fiber-reinforced resin composite materials comprised of epoxy resins, phenolic resins, and other thermosetting resins reinforced by carbon fiber, glass fiber, aromatic polyamide fiber, etc., in particular, carbon fiber reinforced epoxy resin composite materials, have superior specific strength and specific modulus of elasticity, so are widely used in fields demanding high strength, light weight, corrosion resistance, etc., for example, structural members of aircraft, racket frames, golf club shafts, and other sports goods, etc. On the other hand, reflecting the recent technical advances made, composite materials are being required to offer more functions.

The long fiber reinforced composite materials such as carbon fiber reinforced epoxy resins in general are poor in toughness and as a result are weak in impact resistance. Once they break, a sharp broken surface is exposed with the reinforcing fibers sticking out.

As a means for overcoming the problems related to impact resistance, a composite material having a so-called Interleaf has been proposed in U.S. Pat. No. 3,472,730, Japanese Unexamined Patent Publication (Xokai) No. 60-63229, Japanese Unexamined Patent Publication (Kokai) No. 60-231738, etc.

The earliest disclosed among these, U.S. Pat. No. 3,472, 730, discloses use of epoxy resin containing a rubbery substance in a carbon fiber reinforced epoxy resin layer as an interleaf. However, the interleaf layer softened and became fluid at the setting and molding temperature, so there were the problems that it was difficult to form a uniform layer or that the layer would disappear.

Japanese Unexamined Patent Publication (Kokai) No. 60-63229 proposes to eliminate this problem by controlling the viscosity of the interleaf resin comprised of the rubbery substance containing epoxy resin to a specific range, while Japanese Unexamined Patent Publication (Kokai) No. 60-231738 discloses art for supporting the interleaf resin layer by a nonwoven fabric etc.

The basic idea of utilizing an interleaf art, as disclosed in the specifications of the above, lies in disposing a fiber-reinforced resin layer alternately with a resin layer having a large elongation, that is, a soft resin layer, in a laminated state and having the flexure at the time of deformation of the composite material and any shearing energy or breaking energy absorbed by the deformation of the interleaf resin layer.

However, while the above known art did alleviate the problem relating to impact resistance, there was the large problem that the strength and modulus of the resultant composite material, that in, molded bodies, was lower than those of a molded body lacking an interleaf. Further, a satisfactory level still was not achieved with respect to the formation of a uniform interleaf resin layer.

As one of the interleaf arts, proposal was made of the use of a thermoplastic resin film.

Japanese Unexamined Patent Publication (Kokai) No. 60-231738 discloses a thermoplastic resin interleaf and discloses examples of use as interleafe of resin films made of polyether imide, polyether ether ketone, and polyimide. Further, in recent years, art for using as an interleaf specific constructions of polyimide resin films treated for adhesion have been disclosed in Japanese Unexamined Patent Publication (Kokai) No. 64-129, Japanese Unexamined Patent Publication (Kokai) No. 64-97246, etc.

In the art disclosed in Japanese Unexamined Patent Publication (Kokai) No. 64-129, one of the important factors with respect to the effect obtained by use of a thermoplastic resin interleaf was the suitable selection of the molecular structure of the polyimide so as to enable a larger film elongation. An understood from this, theme arts were also based on the technical idea of the afore-mentioned interleaf.

In other words, they were arts for improvement of the impact resistance by introduction of a soft structure.

The use of these thermoplastic resin interleaf arts enabled the formation of a uniform interleaf resin layer. Further, while the strength remained unavoidably lower than that of a molded body with no interleaf in the art disclosed in Japanese Unexamined Patent Publication (Kokai) No. 60-231738, in the art disclosed in Japanese Unexamined Patent Publication (Kokai) No. 64-129 the use of a polyimide film having a performance enabling larger deformation made possible absorption of the flexural stress of the composite material under stress and as a result made possible an increase of the resistance to breaking stress of the composite material and gave a composite material having an improved banding strength.

However, the introduction of a soft structure so as to increase the value of strain under a predetermined stress may be said to be reduction of the elasticity modulus, which means sacrificing the elasticity modulus, one of the superior properties of a fiber-reinforced resin composite material.

Another issue relating to fiber-reinforced resin is the isotrophy of the mechanical performance and dimensional stability. As a method for improving this anisotrophy, there is generally known the method of achieving pseudoisotrophy by laminating layers changing the direction of orientation of the reinforcing fibers. With this method, however, much time and labor are required for cutting out the prepregs and piling them precisely. Further, there is known the method of achieving isotrophy by randomly orienting reinforcing fibers cut to a suitable length and making them into a mat then impregnating this with a matrix resin so as to make a molded body, but with this method the inherent function of the reinforcing fibers cannot be exhibited.

To resolve these problems, it may be considered to use a film having uniform physical properties in both directions as the reinforcing material, but in general film has a strength and elastic modulus over an order smaller than fibers and therefore persons skilled in the art would commonly consider that use of film as a so-called reinforcing material would not be appropriate.

The basic rules of composition showing the strength and elastic modulus of a composite material are given by the following equations (1) and (2):

$$E_o = E_f V_f + E_m V_m \quad (1)$$

$$\sigma_o = \sigma_f V_f + \sigma_m V_m \quad (2)$$

where, $E_o$: elastic modulus of composite material
$\sigma_o$: strength of composite material
$E_f$: elastic modulus of reinforcing material
$\sigma_f$: strength of reinforcing material
$E_m$: elastic modulus of matrix resin
$\sigma_m$: strength of matrix material
$V_f$: volumetric content of reinforcing material in composite material
$V_m$: volumetric content of matrix resin in composite material $$(V_f + V_m = 1)$$

As understood from equation (1) and equation (2), if the resin is fixed, then the physical properties of the composite material, that is, the elastic modulus and the strength, are largely governed by the physical properties of the reinforcing material. It will be further clearly understood from this that film was not considered as-a reinforcing material.

Whatever the case, it is possible to mention the above interleaf arts as examples of the use of film as reinforcing material for composite materials so as to improve the physical properties of molded bodies, but up until now no one has realized an art which can improve even the impact resistance without impairing the elastic modulus and strength, the biggest features of composite materials.

DISCLOSURE OF THE INVENTION

The present invention was made in consideration of the above points and provides a useful novel prepreg and composite material by laminating and bonding a recently developed high strength, high elastic modulus film, resin layer, and/or fiber-reinforced resin layer. That is, The first object of the present invention is to provide a prepreg able to give a high strength, high impact resistant composite material comprised of an alternately laminated and bonded high strength, high elastic modulus film and resin layer.

A second object of the present invention in to provide a prepreg able to give a high strength, high elastic modulus, high impact resistant composite material comprised of at least one high strength, high elastic modulus film and at least one layer of a fiber-reinforced resin layer.

A third object of the present invention is to provide a tubular or rod shaped molded body obtained by winding and forming the above prepreg.

A fourth object of the present invention in to provide a sheet molded body obtained by laminating and forming the above prepreg.

A fifth object of the present invention is to provide a method for manufacturing a tubular or rod shaped molded body by winding a fiber-reinforced resin prepreg, then winding outside it a prepreg comprised of a high strength, high modulus film and resin bonded together.

The first object of the present invention in achieved by a prepreg comprising at least one layer of a film comprising an organic polymer having substantially no melting point and having a tensile modulue of 700 kg/mm$^2$ or more and a tensile strength of 35 kg/nm$^2$ or more and at least one layer of a resin, said film and said resin layer being bonded to each other.

The second object of the present invention is achieved by a prepreg comprising at least one layer of a film comprising an organic polymer having substantially no melting point and having a tensile module of 700 kg/mm$^2$ or more and a tensile strength of 35 kg/mm$^2$ or more and at least one layer of a fiber-reinforced resin layer, said film and said fiber-reinforced resin layer being bonded to each other.

The third object of the present invention is achieved by a tubular molded body comprising at least one film and at least one layer of a resin layer and/or a fiber-reinforced resin layer, wherein said film comprises an organic polymer having substantially no melting point and has a tensile modulus of 700 kg/mm$^2$ or more and a tensile strength of 35 kg/mm$^2$ or more, said film, said resin layer, and/or said fiber reinforced resin layer being bonded to each other.

The fourth object of the present invention in achieved by a shoot molded body comprising at least one layer of a film and at least one layer of a resin and/or a fiber-reinforced rosin layer, wherein said film comprise an organic polymer having substantially no molting point and has a tensile module of 700 kg/mm$^2$ or more and a tensile strength of 35 kg/mm$^2$ or more, said film, said resin layer, and/or said fiber-reinforced resin being bonded to each other.

The fifth object of the present invention is achieved by a method of manufacturing a tubular molded body wherein at least one layer of a film comprising an organic polymer having substantially no melting point and having a tensile modulus of 700 kg/mm$^2$ or more and a tensile strength of 35 kg/mm$^2$ or more and at least one layer of a fiber-reinforced resin layer are wound and laminated to form a tubular molded body, the tension applied to the film at the time of winding the film being 8 kg/mm$^2$ or more.

BRIEF DESCRIPTION OF THE DRAWINGS

FIGS. 1 to 10 are sectional views showing examples of the constructions of prepregs or molded bodies according to the present invention, wherein FIGS. 1 to 6 show examples of sheet like prepregs or molded bodies and FIGS. 7 to 10 show examples of tubular prepregs or molded bodies.

Below, the film used as the reinforcing material in the present invention will be referred to simply an "film".

Figure 1:
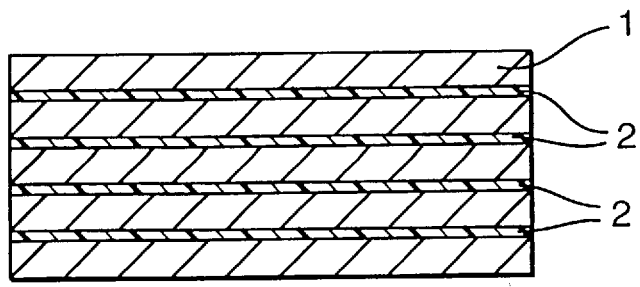

FIG. 1 in a sectional view of an example of a plurality of layers of "film" and resin layers laminated and bonded.

Figure 2:
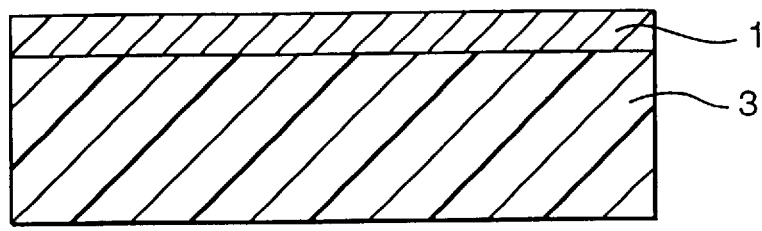

FIG. 2 is a sectional view of an example of a "film" and a fiber-reinforced resin layer bonded one layer at a time.

Figure 3:
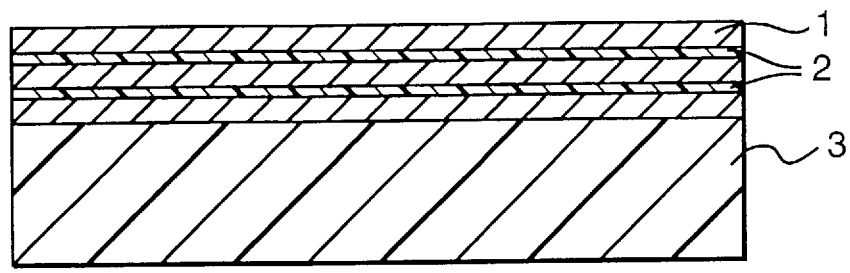

FIG. 3 is a sectional view of an example of bonding of a plurality of layers of "film" to one side of a fiber-reinforced resin layer.

Figure 4:
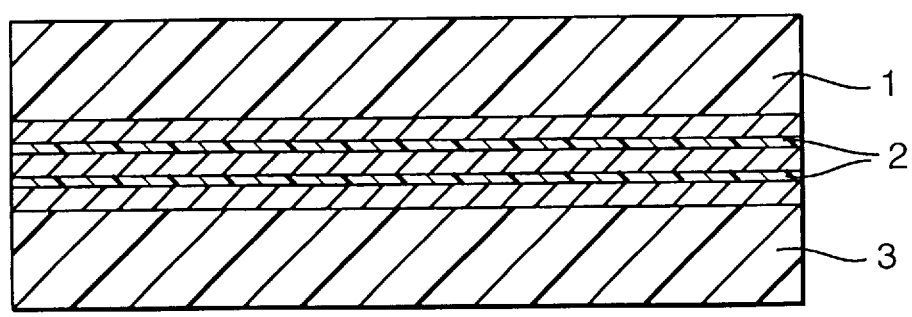

FIG. 4 is a sectional view of an example of bonding a plurality of layers of "film" as an inner layer between two fiber-reinforced resin layers.

Figure 5:
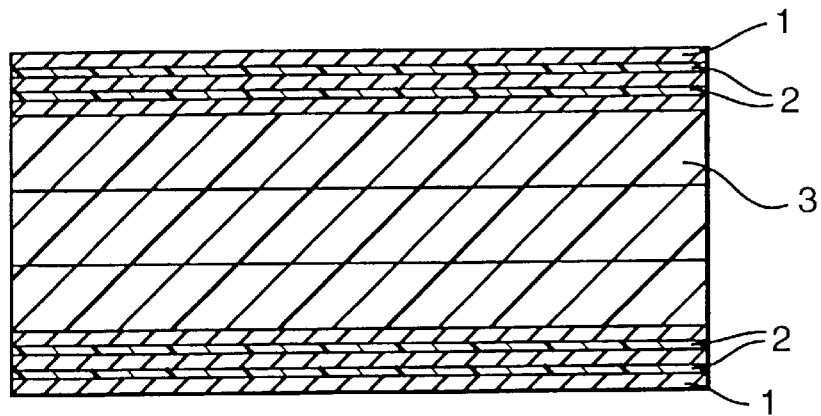

FIG. 5 in a sectional view of an example of bonding a plurality of layers of "film" to the two sides of a plurality of laminated fiber-reinforced resin layers.

Figure 6:
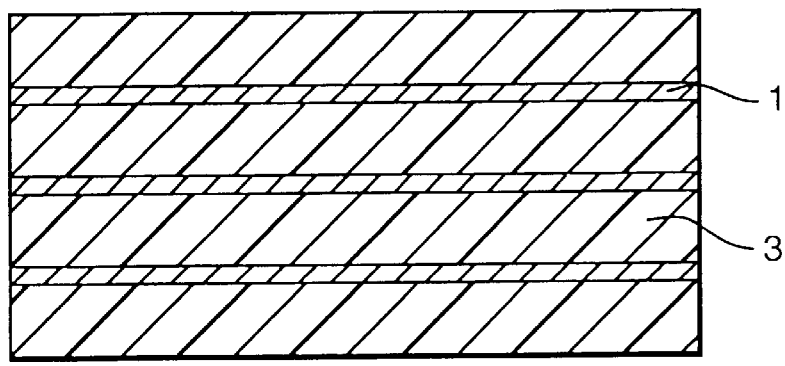

FIG. 6 is a sectional view of an example of alternate bonding of a fiber-reinforced resin layer and a "film".

Figure 7:
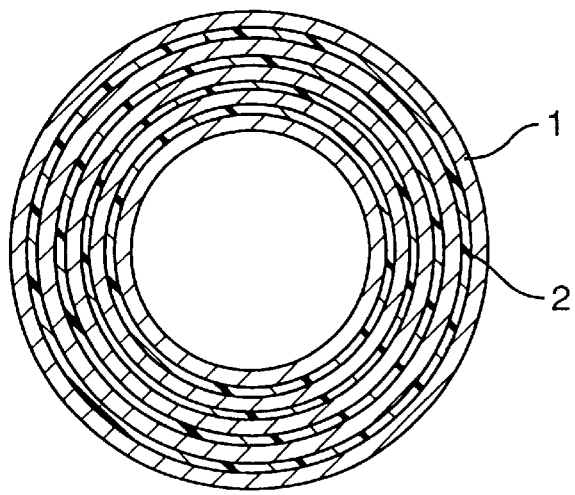

FIG. 7 is a sectional view of an example of a tubular shape obtained by bonding a plurality of layers of "film" and resin layers.

Figure 8:
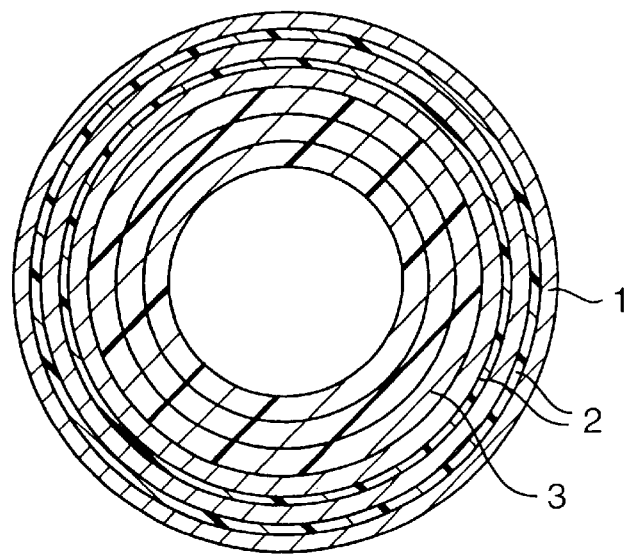

FIG. 8 in a sectional view of an example of a tubular shape obtained by bonding a plurality of layers of "film" to the outside of a plurality of fiber-reinforced resin layers.

Figure 9:
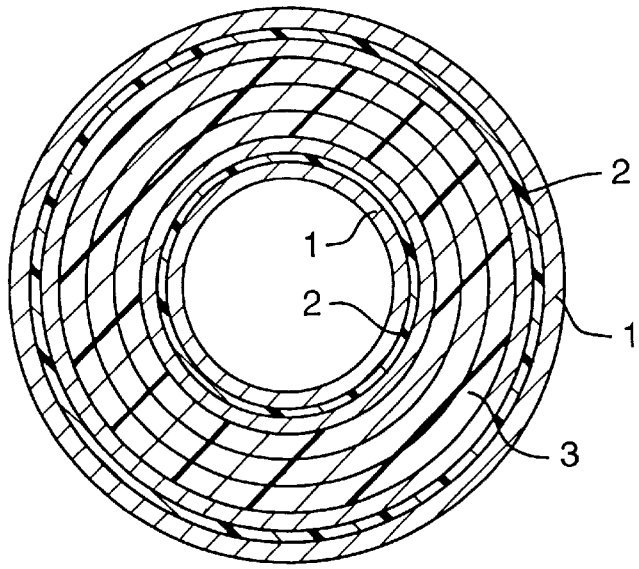

FIG. 9 is a sectional view of an example of a tubular shape obtained by bonding a plurality of layers of "film" to the inside and the outside of a plurality of layers of fiber-reinforced resin layers.

Figure 10:
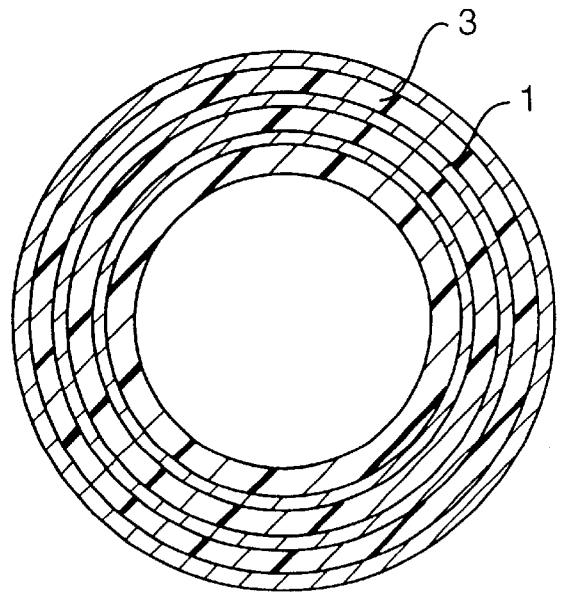

FIG. 10 in a sectional view of an example of a tubular shape obtained by alternate bonding of a fiber-reinforced resin layer and a "film".

BEST MODE FOR CARRYING OUT THE INVENTION

Below, a detailed explanation will be given of the prepreg using a high performance film, a composite material, and a method for manufacturing a tubular molded body according to the present invention.

First, an explanation will be given of the requirements which should be satisfied by the "film".

The "film" of the prevent invention is comprised of an organic polymer having substantially no melting point. Here, "having substantially no melting point" means that the polymer does not decompose, melt, or soften and deform in a temperature range from room temperature to 400° C. This is a requirement so as to keep deterioration, deformation, melting, decomposition, etc. of the "film" due to heat at the time of setting when using it in combination with a thermosetting resin or at the time of combining it with a high melting point thermoplastic resin and heating the latter to melt it and molding it under pressure.

As such an organic polymer, mention may be made of an aromatic polyamide, a polyimide, polybenzimidazole, polybenzibisazole, etc. , but from the excellent of adhesion with a resin and the ease of realization of a high strength and high elastic modulus, aromatic polyamides and polyimides, in particular, aromatic polyamides, are preferable.

In the preferably used aromatic polyamide, there are those with the structure shown by the following general formulas (I) and (II) and copolymers of the same:

$$\{C-R_1-C-NH-R_2-NH\}_n \quad (I)$$
$$\quad \| \quad \| $$
$$\quad O \quad O$$

or $$\{C-R_3-NH\}_m \quad (II)$$
$$\quad \|$$
$$\quad O$$

In the formulas, $R_1$, $R_2$, and $R_3$ may be selected from

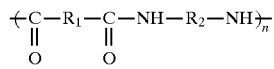

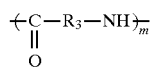

and these hydrogen atoms may be substituted functional groups such as a halogen atom, a methyl group, an ethyl group, methyoxy group, a nitro group, or a sulfone group, and m and n represent an average degree of polymerization of from about 50 to about 1000.

As the polyimide, use is preferably made of a compound shown by the following structural formulas, for example:

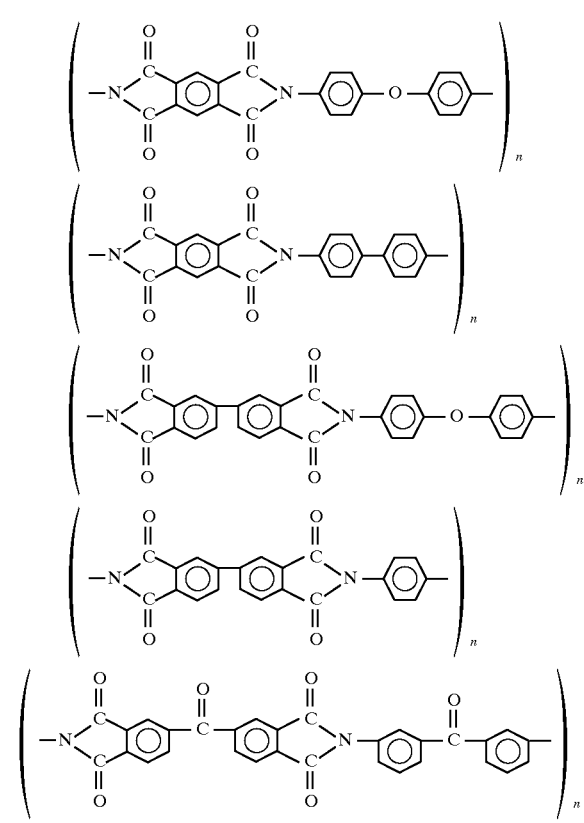

where n is the average degree of polymerization and is from about 30 to about 500.

Such a "film" may be obtained by a method disclosed in Japanese Examined Patent Publication (Kokoku) No. 57-17886, Japanese Unexamined Patent Publication (Kokai) No. 62-194270, Japanese Unexamined Patent Publication (Kokai) No. 62-37124, Japanese Unexamined Patent Publication (Kokai) No. 62-174118, etc. in the case of an aromatic polyamide film or by a method disclosed in Japanese Unexamined Patent Publication (Kokai) No. 55-28822 etc. in the case of a polyimide film.

The "film" may include small amounts of components other than the specific organic polymer to an extent not impairing the effect of the present invention, for example, may include small amounts of organic polymers other than the above, organic low-molecular-weight compounds, inorganic compounds, etc.

As the "film", use may be made of a so-called "tensilized type" which is increased in tensile strength and tensile modulus of elasticity in the direction of the composite product requiring resistance to tensile force. However, use of a "film" having isotropic properties is better in respect to the lower directional property of the mechanical strength and dimensional stability of the resultant molded body. In the present invention, it is sufficient if the tensile strength and the tensile modulus satisfy the above values in as little as one direction, but preferably the mean values of the properties in two arbitrarily selected orthogonal directions satisfy the above values.

In the present invention, in order to manifest a sufficient reinforcing effect, it in preferred that the film and resin should have a large adhesive force between them. The large adhesive force is attained by the following method. The method comprises roughening the surface of the film or tape by making a contrivance in the film-forming process or subjecting the formed film to a physical or chemical etching process, introducing a chemically active need to the surface by corona discharge treatment, plasma treatment, flame treatment, chemical decomposition or the like, carrying out an impregnation treatment before bonding by using an epoxy compound, an isocyanate compound or a resorcinol/formalin latex mixture or by carrying out two or more of the foregoing treatments.

The thickness of the "film" of the present invention is appropriately determined according to the lamination structure of the film and the fiber-reinforced resin layer in the molded product, but the thickness is generally 2 to 100 $\mu$m and preferably 5 to 50 $\mu$m.

If the thickness is less than 2 $\mu$m or more than 100 $\mu$m, the workability is poor and the ratio of the film layer in the prepreg or molded body obtained by lamination becomes difficult to control, so these values are not suitable.

Next, the "film" must have a tensile strength of 35 kg/mm$^2$ or more and a tensile modulus of 700 kg/mm$^2$ or more. Preferably, it has a tensile strength of 45 kg/mm$^2$ or more and a tensile modulus of 1000 kg/mm$^2$ or more.

An mentioned above the strength and the modulus of the composite material are shown in general by equations (1) and (2). Therefore, to obtain a composite material with high physical properties, it is necessary that the "film" have high physical properties. However, note should be taken here of the behavior in the case of combination with a fiberreinforced resin. For example, the 0° flexural strength and modulus of a carbon fiber reinforced resin layer shoot, for example, as shown in the later mentioned Example 7, are 128 kg/mm and 6900 kg/nm$^2$, so compared with these, the value of the modulus of the above "film" is still low. Therefore, in particular, the modulus falls proportionally with the volumetric content of the film layer introduced and with film outside the range of the present invention, that is, film with a low modulus of loss than 700 kg/mm$^2$, that phenomenon appears even more (Comparative Example 5). However, very surprisingly, in the present invention, as shown by Example 12, despite the ratio of the carbon fiber reinforced resin layer (hereinafter referred to as the CF resin layer) being reduced, no decline is seen (Example 8). If converted by the ratio of the CF resin layer, the flexural strength and the modulus are both improved over 10 percent, it may be said.

The same is true with a 90° flexural modulus. Further, the flexural strength increases along with the increase of the film strength, but when the strength of the film meets the requirements of the present invention, that value exhibits the effect equal to or better than the so-called angle play on the CR resin layer, as will be understood from the peripheral flexural strength of the tubular molded body (for example, Example 16 and Comparative Example 2).

In general, in a polymer material, the physical properties change along with the degree of orientation of the molecular chains and the greater the orientation and the modulus, the less the elongation at break. The elongation of the film used in the present invention in face is much smaller than in a film used in the aforementioned interleaf arts.

However, both the Izod impact strength and the drop impact absorption energy, indicators of the impact resistance, are values never before achieved compared with these arts, it should be specially mentioned.

That is, when the "film" meets the requirements of the present invention, a composite material in obtained which is superior in all of the strength, modulus, and impact resistance—completely different from the conventional, known interleaf arts based on the high elongation, soft structure in both technical idea and resultant effects, it must be understood.

Next, an explanation will be made of the resin and the fiber-reinforced resin used in the present invention.

The thermosetting resin used in the present invention is not particularly critical. For example, the thermosetting resin is selected from an epoxy resin, a phenolic resin, a polyimide resin and a polyester resin. An ultraviolet absorber, a flame retardant, an antioxidant, a lubricant, a colorant, a heat stabilizer, an aging preventing agent, a reinforcing staple fiber, a reinforcing powder or particle, a molding chemical, a thermoplasticizer, an elastomer, a rubbery substance, and other usual resin additives may be added.

The thermoplastic resins used in the present invention are not particularly limited and may be for example polyolefins, polyesters, polyamides, polyacrylates, polycarbonates, etc., but from the viewpoint of the heat resistance of the obtained molded body or the range of unable temperature etc., preferably use is made of a so-called suprengineering plastic. As examples of these, there are polysulfone, polyamide imides, polyether imides, polyether ketones, polyether other ketones, polyether sulfones, and polyphenylene sulfide.

At the time of use of those resins, the resins may be used in the form of a solution or dispersion using a suitable solvent or may be used heated and malted. Further, so long as it can be formed into a film, it may be used laminated as is in the film state. In that case, it is effective to improve the adhesion ability of the film by surface treatment by a known method, for example, the corona discharge treatment, plasma treatment, and the like.

As the reinforcing fiber used in the present invention, there can be mentioned glass fiber, carbon fiber, aromatic polyamide fiber, polybenzimidazole fiber, polybenzothiazole fiber and metal-clad fibers thereof, for example, a nickel-plated carbon fiber. Furthermore, inorganic fibers such as an alumina fiber and a silicon carbide fiber can be used. Two or more of these fibers can be used in combination.

The fiber can be used in the form of a unidirectionally fiber-arranged sheet (UD sheet) or a woven fabric or knitted fabric. In the fields where isotropic mechanical properties are required, a nonwoven fabric or a mat comprising fiber cut in an appropriate length and oriented randomly can be used.

The fiber-reinforced resin layer may be made by a known art, for example, the method of impregnating a solution or dispersion of the resin in the above reinforced fiber UD shoot, woven or knitted fabric, nonwoven fabric, or mat, the method of impregnating a malted resin, or the method of laminating a rosin previously formed in a film shape under heating for impregnation.

The ratio of the reinforcing fibers and the resin is suitably selected according to the shape of the reinforced fiber sheet and the type of the reinforcing fibers, but usually a volumetric content of reinforcing fibers in the region of 40 to 70 percent is preferably used.

The prepreg of the present invention in comprised of the above-mentioned "film" and resin and/or fiberreinforced resin layer.

The first embodiment lies in a prepreg comprising at least one layer of a film comprising an organic polymer having substantially no melting point and having a tensile modulus of 700 kg/mm$^2$ or more and a tensile strength of 35 kg/mm$^2$ or more and at least one layer of a resin, said film and said resin layer being bonded to each other.

The "film" itself has almost no heat fusibility or heat adhesivity so the prepreg, as shown in FIG. 1 and FIG. 7, has a structure of the "film" and the resin alternately laminated. The prepreg is not particularly limited and may have the "film" and the resin bonded one shoot or one layer at a time or bonded in a plurality of sheets or plurality of layers at a time and may be shaped an a thin sheet, a plate, tube, etc. Further, w The second embodiment of the prepreg lies in a prepreg comprising at least one layer of a film comprising an organic polymer having substantially no melting point and having a tensile module of 700 kg/mm$^2$ or more and a tensile strength of 35 kg/mm$^2$ or more and at least one layer of a fiber-reinforced resin layer, said film and said fiber-reinforced resin layer being bonded to each other.

The prepreg of the second embodiment, an shown in FIGS. 2 to 6 or FIGS. 8 to 10, may have various lamination structures. That in, the prepreg of the present invention includes the simplest construction of a prepreg where the "film" and fiber-reinforced resin layer are bonded one sheet or one layer at a time (FIG. 2), a prepreg where a plurality of sheets of "film" are bonded to one side of a fiber-reinforced resin layer (FIG. 3 and FIG. 9), a prepreg where the "film" layer in bonded to the inside (inner layer) of a fiber-reinforced resin layer (FIG. 4), a prepreg where a "film" layer is bonded to both sides of a fiber-reinforced resin layer (FIG. 5 and FIG. 9), a prepreg where a fiber-reinforced resin layer and a "film" are alternately bonded (FIG. 6 and FIG. 10) and, further, even a prepreg of a combination of these structures. The prepreg of the present invention may be used in those various constructions and give extremely superior effects as shown in the examples. In this regard, the present invention is a set apart from the above-mentioned interleaf art which was useful only in the came of alternate lamination and enables an extremely wide range of application.

Note that FIG. 7 to FIG. 10 show, for convenience sake, constructions where the layers, that is, the "film", resin layer, and/or fiber-reinforced resin layer, are laminated concentrically. However, as a tubular lamination structure, in many cases, use in made of a lamination structure where the layers are wound spirally in single layers or a plurality of layers.

In the case of bonding a plurality of shoots of "film" as a layer, use is made of "films" bonded together by a resin. As the resin, use may be made of a resin different from the matrix resin of the fiber reinforced resin, but in view of the advantage of enabling molding under the same conditions, it is preferable to use the same resin.

When the matrix resin of the fiber-reinforced resin is a thermosetting resin, the prepreg is the state where the resin is bonded in an uncured or semicured state. For thermoplastic resins, the prepreg is the state able to be used as a material for obtaining the final product.

In a prepreg obtained by bonding a "film" and fiber-reinforced resin layer, the volumetric content of the film in the molded body as a whole should be 5 to 50 percent, preferably 10 to 30 percent. If less than 5 percent, one can only obtain a molded body with unsatisfactory effect of improvement of the impact resistance, and conversely if over 50 percent, there is a large drop in the rigidity of the molded body.

The molded body of the present invention may be a tubular molded body comprising at least one film and at least one layer of a resin layer and/or a fiberreinforced resin layer, wherein said film comprises an organic polymer having substantially no melting point and has a tonsils modulus of 700 kg/mm$^2$ or more and a tensile strength of 35 kg/mm$^2$ or more, said film, said resin layer, and/or said fiber reinforced resin layer being bonded to each other or may be a plate molded body comprising at least one layer of a film and at least one layer of a resin and/or a fiber-reinforced rosin layer, wherein said film comprises an organic polymer having substantially no melting point and has a tensile module of 700 kg/mm$^2$ or more and a tensile strength of 35 kg/mm$^2$ or more, said film, said resin layer, and/or said fiber-reinforced resin being bonded to each other.

The lamination structure of a molded body comprised of a "film", resin layer, and/or fiber-reinforced resin layer is the same as that of the propreg. That is, in a molded body obtained by bonding a "film" and a resin layer, there is the structure of the "film" and resin layer bonded alternately, and in a molded body obtained by bonding a "film" and fiberreinforced resin layer, there are, for example the various structures as shown in FIG. 2 to FIG. 6 and FIG. 8 to FIG. 10.

The molded body is distinguished from a prepreg in being a final product formed into a desired shape by curing of the resin when the matrix resin of the resin layer or the fiber-reinforced resin layer is thermosetting and in being a final product given a desired shape at a temperature above the melting point of the resin when the resin is a thermoplastic one.

The tubular body of the present invention may have various cross-sectional shapes, for example, a true circle, ellipse, or polyhedron and includes many forms such as a straight tube or curved tube with a constant diameter, a tapered tube, or a tube with a partially different diameter or thickness. As a special example, there is included a solid rod shape obtained by using a resin or fiber-reinforced resin rod etc. as a mold and bonding the mold as well to make the final product.

The plate body of the present invention includes, in addition to flat plates, plates with an L-shaped, H-shaped, or other bent sectional shape and also includes a shape bend overall or partially as with a reflecting plate of a parabolic antenna.

Also included in the molded bodies of the present invention are molded bodies of a tubular form made by the so-called sheet rolling method etc., plate molded bodies obtained by laminating closely narrowly slit tape-like prepregs, and tubular molded bodies obtained by winding narrow prepregs in parallel or at an angle with each other.

Next, an explanation will be made of the method of manufacture of the prepregs and the molded bodies of the present invention. The prepreqs and molded bodies of the present invention may be manufactured by various methods.
(1) Prepregs Obtained by Laminating and Bonding Film and Resin Layers
   a. "Film"/thermosetting resin prepregs
   It is possible to manufacture a so-called B stage film-like prepreg having the simplest structure by coating at least one side of the film of the present invention with a melt or solution of a thermosetting resin by a doctor knife etc. and, when necessary, heating the same, so as to laminate one layer at a time of film and resin layer. This prepreg may be further alit for use as a tape-like prepreg of a width of less than 50 mm or a sheet-like prepreg of a width of 500 mm or 1000 mm. Further, use may be made of a single layer of the prepreg as it is, but it is also possible to laminate a plurality of prepregs to made a prepreg with a suitable thickness. Also, it is possible to make a tubular prepreg by winding a single layer of prepreg several times around a mold pre-treated to facilitate mold release, then pulling out the mold.

Since a "film" with extremely high modulus and stiffness is used, the resultant prepreg is easy to handle and enables easy so-called hand layup.

b. "Film"/thermoplastic resin prepregs

The prepreg can be made by, in the same way as in a, for example, by the method of coating a solution or malt of the thermoplastic resin on the "film". Further, by heat-pressing the "film" after the thermoplastic resin is formed into a film shape from the malt or solution state, it is possible to make a prepreg with the "film" and thermoplastic resin layer bonded one layer at a time.

Several layers of the above prepreg may be laminated and heat-pressed to make a prepreg comprised of a plurality of layers of "film" and thermoplastic resin layers bonded together. Note that at that time, the "film" and the thermoplastic resin layer may be alternately laminated in a plurality of sheets and layers and then, for example, subjected to heat pressing etc. to bond the plurality of sheets of film and the thermoplastic resin film.

(2) Prepregs Obtained by Laminating and Bonding Film and Fiber-Reinforced Resin Layers a. "Film"/fiber-reinforced thermosetting resin preproge It is possible to manufacture a prepreg by pressing together a B-stage fiber-reinforced thermosetting resin prepreg and the "film". This prepreg may be made by the method of coating the film in advance with the thermosetting resin in the molten state or coating it in the form of a solution or mixture using a suitable solvent, then heating to expel the solvent and pressing this with a reinforcing fiber sheet under heat.

By laminating a plurality of theme preproge, for example, using a laminator, it is possible to make a prepreg with a large thickness.

Further, by successively laminating prepregs obtained by bonding a resin to one side of a "film" and a fiber-reinforced thermosetting resin prepreg by, for example, a laminator, it is possible to make a prepreg having various lamination structures. For example, by winding them about a stainless steel mold, it is possible to make a tubular prepreg.

A prepreg obtained by bonding a "film" and fiber-reinforced thermosetting resin in backed by a film with a large modulus and stiffness, so is extremely easy to handle. In particular, by bonding with a so-called UD prepreg with fibers unidirectionally disposed, the problems of cracking or opening up along the fiber direction during handling can be eliminated and easy hand layup is possible.

b. "Film"/thermoplastic resin prepregs

For example, the prepregs can be made by the method of heat fusing a fiber-reinforced thermoplastic rosin shout and "film" at a temperature above the melting point of the resin or heating and pressing together the "film" and a thermoplastic resin formed in advance in a film shape and a reinforcing fiber sheet at a temperature above the melting point of the resin.

By using a prepreg obtained by bonding a single shoot of "film" and a single thermoplastic resin layer and a fiber-reinforced thermoplastic resin prepreg and laminating and bonding the same using, for example, a laminator, it is possible to make prepregs with various lamination structures.

(3) Tubular Molded Bodies

A tubular molded body can be obtained winding a prepreg shown in (1) and (2) around a rod shaped mold made of stainless stool with various sectional shapes and heating for thermosetting or heating for melting.

Further, it may be made by filling a prepreg previously prepared in a cylindrical shape into a mold with a desired shape and heating under pressure from the inside.

Also, by using a fiber-reinforced resin rod formed by drawing as the mold for winding the prepreg and setting the resin to make an integral body, a solid rod-shaped molded body may be obtained.

Further, the tubular molded body may be made by winding a fiber-reinforced resin layer on a stainless steel mold of various sectional shapes, then winding on top in a spiral fashion and bonding thereto a tape-like prepreg obtained by bonding a resin to at least one side of a "film", then heating.

In a molding method using this so-called taping, during the taping, the tension applied to the tape-like prepreg is extremely important to obtain a good quality molded body. It is essential that the tension be kept at 9 kg/mm$^2$ per sectional area of the "film". Preferably it is maintained at 10 kg/mm$^2$ or more, more preferably 12 kg/mm$^2$ or more.

When wound with a tension of loss than 8 kg/mm$^2$ the laminated layers are not closely attached, so interlaminar separation tends to occur and only a molded body with insufficient physical properties can be obtained. Further, wrinkles easily occur in the component elements in the molded body, which wrinkles cause a reduction of the physical properties and are also detrimental to the outer appearance.

Winding and bonding the film at a high tension not only enables the fiber-reinforced resin layer and the film to be closely bonded during molding and spreads the matrix resin uniformly throughout the whole article, but also is believed to have the effect of suppressing changes in shape of the molded body due to imparted loads due to the constraining force based on the residual stress remaining in the film even after molding.

The above manufacturing method represents the fifth invention of the present invention. To enable molding meeting the above requirements to be performed stably, it is important that the film be high in strength and high in modulus.

(4) Plate Molded Bodies

It is possible to obtain a plate-shaped molded body by filling the prepregs shown in (1) and (2) into a mold of a desired shape and curing them under pressure at the curing temperature of the thermosetting resin or melting the same at a temperature above the melting point of a thermoplastic rosin. By suitably selecting the shape of the mold and the method of lamination of the prepregs, it is possible to make not only a so-called flat plate, but also a molded body having a bent shape, such as an L-shaped or H-shaped section, or a partially or wholly curved shape. These are included in the scope of plate molded bodies.

Further, at the time of molding, it is possible to use the method of directly laminating and filling "film", resin film, and/or reinforcing fiber sheets into a mold and heating and pressing the same in addition to once using a prepreg.

As mentioned above, the molded body comprised of a composite material obtained based on the present invention has extremely superior physical properties never obtained before now, such as strength, modulus, and impact resistance, and further has the features of superior absorption of vibration, light weight, corrosion resistance, and easy of working. Making use of these features, it can be widely used for golf club shafts, fishing rods, ski poles, tennis and badminton racket frames, and other sports and leisure goods and also bicycle frames, outer panels and structural members of automobiles, ships, etc., and further even aerospace applications such as rocket motor cases, aircraft structural members, space station structural members, etc.

Next, an explanation will be given of the methods of measurement of the physical properties of the "film" and the molded bodies in the present invention.

a. Tensile Strength and Elongation and Modulus of Film.

A fixed speed stretch type strength and elongation measuring apparatus (Autograph Model DSS-500 made by Shimadsu Seisakusho) was used. A film sample whose thickness was measured by a dial gauge was cut into a 100 mm×10 rectangular shape. A load-strain curve was drawn with an initial clamping length of 30 mm and a tensile speed of 30 mm/min, and the tensile strength TS (kg/mm$^2$), elongation at break TE (%), and tensile modulus $M_i$ (kg/mm$^2$) were found from the same.

$$TS=P/10t$$

$$TE=l/30\times100$$

$$M_i=P_i/10t\times30/l_i$$

where,

P: tensile load at break (kg)

t: film thickness (mm)

l: tensile strain at break (mm)

$P_i$: load (kg) at strain $l_i$ at straight line portion of load-strain curve b. Tensile Strength and Elongation and Modulus of Plate Molded Body A sample of a size of 10 m width and 150 mm length was cut out from a plate obtained by laminating "film" and resin, the two ends were adhered to tapered glass fiber reinforced resin tabs (length 50 mm), and the result used as a test piece.

The test piece was met in a Shimadzu Seisakusho universal tester (tradename: Autograph Model AG-10) at a clamping interval of 50 mm, stretched at a tensile speed of 0.5 mm/min, and the tensile strength $\sigma_T$ (kg/mm$^2$), breaking strain $e_T$ (%), and tensile modulus $E_T$ (kg/mm$^2$).

$$\sigma_T=P/Wt$$

$$e_T=l/50\times100$$

$$E_T=P_i/Wt\cdot50/l_i$$

where,

P: tensile load at break (kg)

t: test piece thickness (m)

W: width of test piece (m)

l: tensile strain at break (mm)

$P_i$: load (kg) at strain $l_i$ at straight line portion of load-strain curve c. Axial Compression Strength A test piece having a length of 13 mm was cut out from a tubular molded body and was compressed in the longitudinal direction at a compressing speed of 1 mm/min by using a Shimadzu Seisakusho universal tester (Autograph Model AG-10) and the maximum breaking strength was measured. The axial compression strength was calculated according to the following formula:

$$\sigma_1=4P/\pi(d_2^2-d_1^2)$$

where, $\sigma_1$: axial compression strength (kg/mm$^2$)

$d_1$: inner diameter of the test piece (mm)

$d_2$: outer diameter of the test piece (mm)

P: maximum breaking strength (kg)

d. Face Compression Strength

A test piece having a length of 17 mm was cut out from a tubular molded body and was compressed in the radial direction at a compressing speed of 1 mm/min. The maximum breaking strength was measured. The face compression strength was calculated according to the following formula:

$$\sigma_2=3P/\pi L d_1\times(d_2+d_1)^2/(d_2=D_1)^2$$

where, $\sigma_2$: face compression strength (kg/mm$^2$)

L: length (mm) of the test piece

Other symbols are as defined in the method of measurement of the axial compression strength.

e. Izod Impact-Absorbing Energy

A test piece having a length of 64 cm was cut out from the tubular molded body and directly used for the test. The test was carried out at a hammer weight of 3.974 kg and a lift-up angle of 135° by a Shimadzu Seisakuaho Izod impact tooter. The impact-absorbing energy was calculated according to the following formulas:

$$E=4WR(cos\ \beta-cos\ 135°)/\pi(d_2^2-d_1^2)$$

where,

E: Izod impact-absorbing energy (kg·cm/cm$^2$)

W: weight (3.874 kg) of the hammer

R: distance (22.41 cm) between the axis of the hammer and the center of gravity thereof β: angle (°) at which the hammer, which has broken the sample, swings up on the opposite side.

f. Flexural Strength and Flexural Modulus of Tubular Body

A test piece having a length of 120 mm was cut out and tested by using a Shimadzu Seisakusho universal tester (Autograph Model AG-10) at a banding speed of 3 mm/min while adjusting the distance between fulcra to 100 mm. The top end of a compressing wedge was of R5 and the top and of the fulcrum was of R2. The flexural strength of, and flexural modulus $Ef_p$ were calculated from the obtained load-deflection curve.

$$\sigma f_p=8\cdot L\cdot d_2\cdot P/\pi(d_2^4=d_1^4)$$

where, $\sigma f_p$: flexural strength (kg/mm$^2$)

$d_1$: inner diameter of the test piece (mm)

$d_2$: outer diameter of the test piece (mm)

L: distance between fulcra (mm)

P: flexural load at break (kg)

$$Ef_p=4\cdot L^3/3\pi(d_2^4=d_1^4)\cdot F/y$$

where, $Ef_p$: flexural modulus (kg/mm$^2$)

F/y: gradient (kg/mm) of the straight portion of the load-deflection curve.

g. Flexural Strength and Flexural Modulus of Plate

A test piece having a width of 25 mm and a length of 50 mm was cut out from a laminated board and was tested using a Shimadzu Seisakusho universal tester (Autograph Model AG-10) at a bending speed of 2 mm/min while adjusting the distance between fulcra to 35 mm. The top end of a compressing wedge was of R5 and the top end of the fulcrum was of R2. The flexural strength ($\sigma f$) and flexural modulus (Ef) were calculated from the obtained load-deflection curve according to the following formula:

$$\sigma f = 3PL/2Wh^2$$

where, $\sigma f$: flexural strength (kg/mm$^2$)
W: width (mm) of the test piece
h: thickness (mm) of the test piece
L: distance (mm) between fulcra
P: maximum breaking load (kg)

$$Ef = L^3/4Wh^3 \cdot F/y$$

where,

Ef: flexural modulus (kg/mm$^2$)
F/y: gradient (kg/mm) of the straight portion of the load-deflection curve.

h. Drop-Impact Test

A test piece having a size of 100 mm×100 mm was cut out from a laminated board and tested using a drop impact tester supplied by Rheometrix under conditions of a load of 30 kg, a dropping height of 20 cm and a test speed of 2 m/sec. The total absorption energy was determined from the obtained absorption energy curve.

Below, the present invention will be explained in further detail using examples.

First, an explanation will be given of the method of manufacturing the aromatic polyamide film used in the examples.

An aromatic polyamide film was prepared using poly-p-phenyleneterephthalamide (hereinafter referred to as PPTA). The PPTA was dissolved in a 98 percent concentrated sulfuric acid at a concentration of 0.5 g/100 ml. The logarithmic viscosity number was 5.5 at 30° C. The PPTA was dissolved in 99.5 percent sulfuric acid to give a polymer concentration of 12 percent and to obtain an optically anisotropic dope. The dope was deaerated in vacuo, filtered, passed through a gear pump, extruded from a slit die, cast on a belt of tantalum having a polished mirror surface, passed through an air atmosphere, maintained at a relative humidity of about 40 percent and a temperature of about 90° C. to render the cast dope optically isotropic, and introduced into a 30 percent aqueous solution of sulfuric acid maintained at 20° C. together with the belt to coagulate the cast dope.

Next, the coagulated film was peeled from the belt, neutralized with an aqueous solution of sodium hydroxide and washed with water. The washed film was drawn by a roller in the longitudinal direction (MD direction) without drying. Then, the film was drawn by a tenter in the lateral direction (TD direction), then dried at 200° C. while keeping the length constant and heat-treated at 300° C. while keeping the length constant, giving a PPTA film of a thickness of 20 μm (film A) and a PPTA film of a thickness of 10 μm (film B).

The physical properties of the film A and the film B are shown in Table 1 together with the physical properties of films used in the other examples and comparative examples, i.e., Upilex-20S (phonetic) of Ube industry, Upilex-20R (phonetic), Capton 100H of E.I. Dupont Nemours, and a 20 μm polyethylene terephthalate (hereinafter referred to as PET) film obtained by malt film formation using a T-die.

Films A and B and Upilex-20S were films suitable for the present invention, while the others were unsuitable films.

TABLE 1

Physical Properties of Various Films

| Film name (thickness: μm) | Tensile strength (kg/mm$^2$) | Tensile modulus (kg/mm$^2$) | Elongation at break (%) | Melting point or decomposition temperature (°C.) | Remarks |
|---|---|---|---|---|---|
| Film A (20) | 43.9 | 1290 | 23.5 | 400 or more | |
| Film B (10) | 44.8 | 1350 | 25.6 | 400 or more | |
| Upilex 20S (20) | 42.2 | 810 | 34.2 | 400 or more | Ube Industry |
| Upilex 20R (20) | 34.0 | 380 | 145.1 | 400 or more | " |
| Capton 100H (25) | 31.0 | 300 | 92.7 | 400 or more | E. I. Dupont Nemours |
| PET (20) | 25.1 | 400 | 130.3 | 270 | |

First, examples will be shown regarding the prepregs and molded bodies obtainable by bonding a "film" and resin (Examples 1 to 5).

EXAMPLE 1

One surface of the film A was coated with an epoxy resin #7714 made by Kasei Fiberlight Co. (mixture of methyl ethyl ketone, solid content of 70 percent by weight) using a coater of Yuri Roll Kikai Co. by the comma direct method. This was heated at 100° C. for 15 minutes to make the film A/epoxy prepreg. The thickness of the epoxy resin was about 10 μm.

The above prepreg was laminated by a stainless steel roll coated with Teflon and having a diameter of 100 μm, under pressure by a nip roll, until 35 prepregs were wound up. A short book like laminated prepreg was obtained by cutting open one location of the obtained wound body along the axial line.

This was placed in a rectangular flat mold and hold there at 120° C. and 0.5 kg/mm$^2$ for 15 minutes, then heated and pressed at 150° C. and 50 kg/m$^2$ for 60 minutes. The mold was cooled to room temperature, then the molded body was taken out, to obtain a laminated board of a thickness of 1 mm.

The physical properties of the resultant laminated board are shown in Table 2.

In the same way as the later mentioned Example 4, the molded body obtained by bonding the "film" and the resin of the present invention has an extremely high strength, it will be understood. That is, in general, the physical proportion of resin materials of the type referred to an engineering plastics are the values of the extent shown below:

Tensile strength: 10 to 20 kg/mm$^2$
Flexural strength: 8 to 20 kg/mm$^2$
Flexural modulus: 300 to 500 kg/mm$^2$ Even in the case of reinforcement by glass staple fibers, the values are about the below:

Tensile strength: 15 to 20 kg/mm$^2$
Flexural strength: 15 to 30 kg/mm$^2$
Flexural modulus: 700 to 1100 kg/mm$^2$ Comparing these values with the values in Table 2, the superiority of the strength of the molded body of the present invention will be clear.

On the other hand, the molded body has a large strain compared with the later mentioned fiber-reinforced resin. As a result, the molded body obtained by bonding the "film" and resin of the present Invention is an extremely tough new molded body never before seen.

EXAMPLE 2

A stainless steel rod having a diameter of 10 mm was used as the mold. The epoxy resin-coated prepreg was supplied into the mold in the vertical direction and was wound and laminated 35 turns. This was wrapped with a polyethylene terephthalate tape (referred to as PET tape) having a width of 15 mm and a thickness of 30 μm which had been subjected to a releasing treatment, and curing was carried out for 2 hours in a hot air-circulating heater maintained at 140° C. The cured molded body was taken out and the PET tape was removed, and the mold was drawn out to obtain a tubular molded body having an inner diameter of 10 mm and an outer diameter of 12 mm.

EXAMPLE 3

The propreg obtained body bonding epoxy resin to the film A, obtained in Example 1, was slit into a tape-like prepreg having a width of 15 mm.

By using a taping machine supplied by Shimano Kogyo, the tape-like prepreg was wound at a pitch of 3 mm on a stainless steel rod having a diameter of 10 mm while feeding it in the longitudinal direction. Then, the winding direction was reversed and the tape was similarly wound. This operation was repeated 7 times to obtain a spirally laminated molded body. In the same manner as described in Example 2, the molded body was wrapped with the PET tape, curing was carried out, the PET tape was removed and the mold was drawn out to obtain a pipe-shaped composite material having an inner diameter of 10 mm and an outer diameter of 12 mm.

Comparative Example 1

Prepregs obtained by bonding epoxy rosin were made in the same way as Example 1 using Capton 100H (phonetic) and PET film as the film. The two prepregs were wound and laminated in the same way as in Example 2 to make tubular molded bodies of an inner diameter of 10 mm and an outer diameter of about 12 mm

EXAMPLE 4

Polyphenylene sulfide (hereinafter referred to as PPS) supplied by Toray-Phillips was heated and melted at 340° C., extruded from a alit die, and cast in the form of a film on film A running on a roll below the die. Then, the laminated films were pressed between a pair of nip rolls disposed Just downstream to make a prepreg of bonded "film" and PPS of a total thickness of 30 μm.

The prepreg was cut in a short book form and set in 35 layers in a rectangular flat mold. These were heated and pressed for 10 minutes under conditions of 350° C. and 20 kg/cm$^2$ by a hot-press apparatus. The pressed assembly was cooled to 50° C. to obtain a laminated board having a thickness of 1 mm.

EXAMPLE 5

The prepreg obtained in Example 4 was slit into a tape having a width of 10 mm to obtain a tape-like prepreg. This tape-like prepreg was fed at a pitch of 2.5 mm to a rod-shaped stainless steel mold having a diameter of 10 mm by using a taping machine and wound at a tension of 10 kg. This operation was repeated 8 times for a lamination corresponding to 32 layers of the film A. The winding-initiating and winding-terminating ends were fixed by a stainless steel collar, and the assembly was heated for 5 minutes in an oven maintained at 350° C. This was cooled to room temperature, then the mold was drawn out to obtain a laminated tube having an inner diameter of 10 mm and an outer diameter of about 12 mm.

Comparative Example 2

Carbon Fiber Reinforced Epoxy Resin Pipe (CF/Epoxy Pipe)

A CF/epoxy pipe was formed as follows to clarify the position of the physical properties of the molded body obtained from a prepreg comprising the "film" and resin layer bonded together.

A CF/epoxy UD prepreg (tradename: Fiberdux (phonetic) (0.2 mm thick)) supplied by Asahi Composite was wound in five layers around a stainless steel rod mold having a diameter of 10 mm at an angle with the longitudinal direction of the mold of 0° and 25°. On top of this was wrapped PET tape treated for release, then the assembly was heated and cured in an oven at 150° C. This was allowed to cool to room temperature, then the mold was withdrawn to make two types of laminate pipes with inner diameters of 10 mm and outer diameters of about 12 mm.

Comparative Example 3

Metal Pipe

To clarify the position of the physical properties of the molded body obtained from a prepreg comprising the "film" and resin bonded together, pipes of aluminum and iron of an inner diameter of 10 mm and outer diameter of 12 mm were prepared and the physical properties thereof evaluated.

The physical properties of the laminated board of Examples 1 and 4 are shown in Table 2.

In the case of use of a thermoplastic resin, there are the advantages of simplification of the molding operation and the higher toughness due to the increase of the strain of the molded body.

The results of Examples 2, 3, and 5 and Comparative Examples 1 to 3 are shown in Table 3.

As may be foreseen from the physical properties of the board, the physical proportion of the tubular body of the present invention are comparable to the physical properties of a CF·UD prepreg angle-ply laminated. It is suggested that reinforcement is realized in directions other than the direction of fiber orientation and that more isotropic physical properties can be imparted.

As opposed to this, with a soft film not suited to the present invention, only physical properties obtainable with the conventional general use rosin materials could be obtained.

TABLE 2

Physical Properties of PPTA Film/Resin Laminated Board

| Physical properties | Example 1<br>20 μm PPTA film<br>Epoxy resin | Example 5<br>20 μm PPTA film<br>PPS |
|---|---|---|
| Tensile strength (kg/mm$^2$) | 41.6 | 43.7 |
| Specific strength of same | 29.7 | 31.4 |
| Tensile modulus (kg/mm$^2$) | 1160 | 1180 |
| Specific modulus of same | 830 | 850 |
| Tensile strain at break (%) | 28.2 | 31.4 |
| Flexural strength (kg/mm$^2$) | 34.6 | 37.2 |
| Specific strength of same | 24.7 | 26.8 |
| Flexural modulus (kg/mm$^2$) | 370 | 380 |
| Specific modulus of same | 260 | 270 | impregnated with an uncured epoxy resin, so when cutting the prepreg to a desired size or laminating it, there is a tendency for spaces to appear between the CR yarns during the operation of peeling off the release paper on which the prepreg is placed, thus requiring careful handling.

As opposed to this, the prepreg of the present invention has stiff fibers closely adhered and can be handled as an integral molded body as is, so there is no appearance of spaces between fibers forming the UD prepreg and the handling becomes extremely easy.

Nine layers of prepregs were laminated so that the carbon fibers were in the same direction. The vacuum bag autoclave method was used to obtain a laminated board at a temperature of 150° C., a pressure of 7 kg/cm$^2$, requiring 2 hours time. The thickness of the resultant laminate board was about 2 mm and the board had a structure of film layers and CF/epoxy layers alternately laminated.

EXAMPLE 7 AND COMPARATIVE EXAMPLE 4

Laminate boards were made by molding under the same conditions as Example 6 using as the film Upilex-20S (phonetic) (Example 7) and Capton 100H (phonetic) (Comparative Example 4).

EXAMPLE 8

The film A was coated with an epoxy resin #7714 made by Kasei Fiberlight Co. using a coater of Yuri Roll Kikai Co.

TABLE 3

Physical Properties of Tubular Bodies of Various Materials

| Physical properties | Ex. 2<br>20 μm<br>PPTA<br>film/<br>epoxy | Ex. 3<br>20 μm<br>PPTA<br>film/<br>epoxy | Comp. Ex. 1<br>Cap-<br>ton<br>100H/<br>epoxy | Ex. 5<br>20 μm<br>PET<br>film/<br>epoxy | 20 μm<br>PPTA<br>film/<br>PPS | Comp. Ex. 2<br>CF/<br>epoxy<br>UD<br>pre-<br>preg<br>(0°) | CF/<br>epoxy<br>UD<br>pre-<br>preg<br>(25°) | Comp. Ex. 3 | |
|---|---|---|---|---|---|---|---|---|---|
| | | | | | | | | Alum-<br>inum | Iron |
| Axial compressive strength (kg/mm$^2$) | 15.8 | 15.5 | 11.6 | 10.7 | 14.9 | 54.9 | 21.1 | 12.2 | 64.7 |
| Specific strength of same | 11.4 | 11.1 | 8.3 | 7.8 | 10.8 | 34.2 | 13.4 | 4.7 | 8.6 |
| Face compressive strength (kg/mm$^2$) | 41.9 | 42.6 | 16.6 | 15.7 | 41.0 | 9.6 | 35.2 | 29.2 | 50.3 |
| Specific strength of same | 30.1 | 30.6 | 11.9 | 11.4 | 29.5 | 6.0 | 22.3 | 11.2 | 6.7 |
| 3-point flexural strength (kg/mm$^2$) | 17.4 | 18.1 | 12.7 | 10.8 | 18.8 | 10.2 | 17.3 | | |
| Specific strength of same | 12.5 | 13.0 | 9.1 | 7.8 | 13.6 | 6.4 | 10.9 | | |
| 3-point flexural modulus (kg/mm$^2$) | 650 | 620 | 410 | 370 | 570 | 530 | 1360 | | |
| Specific modulus of same | 470 | 450 | 290 | 270 | 410 | 310 | 860 | | |
| Izod impact strength (kg · cm/cm$^2$) | 311 | 302 | 175 | 94 | 324 | 154 | 251 | | |

Next, an explanation will be given of prepregs obtained by bonding "film" and fiber-reinforced resin and the plate molded bodies obtainable by molding the same, based on examples (Examples 6 to 12).

EXAMPLE 6

A prepreg was made by pressing the film A onto one surface of the CF/epoxy UD prepreg (Fiberdux (phonetic) made by Asahi Composite) used in Comparative Example 2 using a laminate roll at conditions of a temperature of 90° C. and a line pressure of 6 kg.

In general, such a UD prepreg is comprised of a sheet of a large number of CF yarns arranged unidirectionally by the direct gravure method. This was heated at 100° C. for 15 minutes to make the film A/epoxy prepreg.

First four of the film A/epoxy prepregs and then 14 of the CF/epoxy UD prepregs (Fiberdux (phonetic) made by Asahi Composite, 0.2 mm thick) laid in the same direction as the fibers, then four of the film A/epoxy prepregs again were laminated successively using a laminate roll. This was subjected to air-bag autoclave molding under the same conditions am Example 6 to obtain a laminate board of a thickness of about 3 mm. The laminate board had a structure of the CF/epoxy layers sandwiched by the film A.

Comparative Example 5

A laminate board was obtained by molding by the same conditions as Example 8 using Capton 100H (phonetic) as a film.

Comparative Examples 6 and 7

Ten layers (Comparative Example 6) or 15 layers (Comparative Example 7) of just the CF/epoxy UD prepregs were laminated in the same fiber direction and molded in an autoclave to give laminate boards of thicknesses of 2 mm and 3 mm.

The physical properties of the plate molded bodies of Examples 6 and 7 and Comparative Examples 4 and 6 are shown in Table 4 and the physical properties of the plate bodies of Example 8 and Comparative Examples 5 and 7 are shown in Table 5.

All of the plate bodies obtained using film in the examples and the comparative examples were vastly improved in impact resistance. However, regarding strength and modulus, only the examples of the present invention achieved physical properties equal or better than plate bodies not using film.

As explained in the general discussion, the physical properties of composite materials are defined by the sum of the physical properties of the individual materials constituting the same with consideration to the ratios of those materials. Therefore, it is envisioned that the modulus in the reinforcing fiber direction would drop along with a decrease in the ratio of the fiber-reinforced resin layer and an increase in the film layer. Despite this, the plate body of the present invention maintains not only the strength, but even the modulus—an unexpected result.

Further, regarding a direction orthogonal to the fiber direction, it in clear from the comparative examples that the film elongates tremendously and easily deforms when soft. The only film which can give impact resistance without sacrificing the properties of the fiber-reinforced resin is that meeting the requirements of the present invention.

TABLE 4

Physical Properties of Board Composed of Film and CF Reinforced Epoxy Resin Alternately Laminated

| | | 0° flexure | | | 90° flexure | | | Drop |
|---|---|---|---|---|---|---|---|---|
| | Film | Strength (kg/mm$^2$) | Modulus (kg/mm$^2$) | Strain (%) | Strength (kg/mm$^2$) | Modulus (kg/mm$^2$) | Strain (%) | impact (J/mm) |
| Ex. 6 | 20 μm PPTA film | 138 | 9140 | 1.6 | 15.4 | 744 | 2.3 | 4.6 |
| Ex. 7 | Upilex 20S | 137 | 9110 | 1.5 | 14.6 | 727 | 2.0 | 4.6 |
| Comp. Ex. 4 | Capton 100H | 128 | 8910 | 1.5 | 13.6 | 658 | 2.2 | 4.7 |
| Comp. Ex. 6 | None | 135 | 9180 | 1.6 | 11.5 | 895 | 1.8 | 3.0 |

TABLE 5

Physical Properties of Board Composed of Film Laminated to Both Sides of CF Reinforced Epoxy Resin

| | | 0° flexure | | | 90° flexure | | | Drop |
|---|---|---|---|---|---|---|---|---|
| | Film | Strength (kg/mm$^2$) | Modulus (kg/mm$^2$) | Strain (%) | Strength (kg/mm$^2$) | Modulus (kg/mm$^2$) | Strain (%) | impact (J/mm) |
| Ex. 8 | 20 μm PPTA film | 128 | 7300 | 2.3 | 12.5 | 781 | 2.5 | 6.6 |
| Comp. Ex. 5 | Capton 100H | 107 | 5540 | 2.4 | 11.3 | 698 | 1.8 | 6.5 |
| Comp. Ex. 7 | None | 128 | 6900 | 2.2 | 11.5 | 794 | 1.6 | 2.9 |

EXAMPLE 9

The prepreg composed of the film and PPS obtained in Example 4 (hereinafter referred to as the A/PPS) and the UD sheet/PPS prepreg of carbon fiber supplied by Phillips Petroleum (tradename: Ryton ACM (phonetic)) were laminated as follows. At first, four sheets of film A/PPS were laminated, then on top of that nine sheets of Ryton ACM (tradename) (phonetic) were piled so that the fiber axes were in agreement with one another. Then, four shoots of film A/PPS were laminated to obtain a hard prepreg. This hard prepreg was charged in a rectangular flat mold and heat-pressed at 350° C. under a pressure of 20 kg/cm$^2$ for 20 minutes. Then, this was cooled to 50° C. and taken out from the mold to obtain a laminated board having a thickness of about 2 mm.

EXAMPLE 10

The same hard prepreg as in Example 9 was charged into a mold having a curved face with a radius of curvature of 500 mm and heat-pressed at a temperature of 350° C. and a pressure of 20 kg/cm$^2$ for 30 minutes, then cooled to 50° C., then the molded body extracted, to make a dish shaped molded body.

EXAMPLE 11

The surface of the film B was subjected to a blasting treatment by using 180-mesh river sand particles. The film and a carbon fiber UD sheet (APC-2) supplied by ICI impregnated with polyether other ketone (hereinafter referred to as PEEK) were laminated between a pair of heating rolls heated to 350° C. under a line pressure of 10 kg to make the prepreg. Compared with APC-2, the prepreg backed with the film had less cracking along the fiber direction and was extremely easy to handle.

Ton layers of the prepreg were laminated so that the directions of fibers were in agreement with one another. The laminate was charged in a mold, heat-pressed at 360° C. under 45 kg/cm$^2$ for 20 minutes and cooled to 60° C. to make a laminate board having a thickness of about 2.2 mm.

EXAMPLE 12

A 1420-denier yarn of an aromatic polyamide fiber (Kevlar 49 (phonetic)) supplied by Du Pont was set at a creol, and the yarn was introduced into a 25 percent solution of polyether sulfone supplied by ICI (hereinafter referred to as PES) in dimethyl acetamide. (hereinafter referred to a DMAc) and impregnated with the solution. The impregnated fiber was carefully wound at a pitch of 1 mm on a stainless steel drum, at which a silicon release paper had been set in advance, so that no space would be formed between adjacent yarns. The fiber was heated at 100° C. for 3 hours while rotating the drum whereby the solvent was removed. At one point, the fiber was cut and opened together with the release paper to obtain an aromatic polyamide fiber-reinforced PES having a thickness of 0.2 mm.

Separately, film A was coated with a 25 percent solution of PES in DMAc by using a gravure coater and the solvent was removed by heating to obtain a film-like prepreg having a thickness of 40 μm and having one surface coated with PES. This film was laminated in three layers and nine aromatic polyamide fiber-reinforced PBS sheets were laminated on top of the same so that the directions of fiber axes were in agreement with one another, then another three layers of the film-like prepreg were laminated. The assembly was charged in a rectangular flat mold and heatpressed at 320° C. under a pressure of 100 kg/cm$^2$ for 20 minutes. This was cooled to 60° C. and the laminated board was taken out from the mold. The thickness of the laminated board was about 2 mm.

Comparative Example 8

Ten layers of a carbon fiber UD/PPS (product name Ryton ACM (phonetic)) were laminated alone and then molded under the same molding conditions as Example 9 to obtain a unidirectional laminated board of a thickness of 2 mm.

Comparative Example 9

Ten layers of a carbon Fiber UD prepreg impregnated with PEEK (product name APC-2) were laminated alone and the same molding conditions as in Example 11 used to obtain a unidirectional laminated board of a thickness of 2 mm.

Comparative Example 10

Ten layers of a Kevlar 49 (phonetic) fiber UD prepreg impregnated with the same PES an used in Example 12 were laminated alone and molded under the same molding conditions as used in Example 12 to obtain a unidirectional laminated board of a thickness of 2 mm.

The physical properties of the laminated boards obtained in Examples 9, 11, and 12 and Comparative Examples 8, 9, and 12 are shown in Table 6.

TABLE 6

Physical Properties of Board Composed of Film and Fiber-Reinforced Thermoplastic Resin Bonded Together

| | Film | Reinforcing fiber | Resin | Laminate structure of film and fiber reinforced resin | 0° flexure | | 90° flexure | | Drop impact |
| --- | --- | --- | --- | --- | --- | --- | --- | --- | --- |
| | | | | | Strength (kg/mm$^2$) | Modulus (kg/mm$^2$) | Strength (kg/mm$^2$) | Modulus (kg/mm$^2$) | (J/mm) |
| Ex. 9 | 20 μm PPTA film | Carbon fiber | PPS | CF/PS layer bonded with film on both sides | 208 | 12300 | 10.8 | 520 | 7.8 |
| Ex. 11 | 10 μm PPTA (blast-ed) film | Carbon fiber | PEEK | CF reinforced PEEK layer and film laminated alternately one layer each | 214 | 12700 | 10.0 | 770 | 8.3 |
| Ex. 12 | 20 μm PPTA film | Aromatic polyamide fiber | PES | AF reinforced PES layer bonded on both sides with film | 71 | 6040 | 6.1 | 510 | 7.1 |
| Comp. Ex. 8 | None | Carbon fiber | PPS | — | 193 | 12500 | 7.9 | 780 | 4.5 |
| Comp. Ex. 9 | None | Carbon fiber | PEEK | — | 197 | 12600 | 8.5 | 840 | 4.8 |
| Comp. Ex. | None | Aromatic | PES | | 67 | 6100 | 4.4 | 510 | 4.3 |

TABLE 6-continued

Physical Properties of Board Composed of Film and Fiber-Reinforced Thermoplastic Resin Bonded Together

| | Film | Reinforcing fiber | Resin | Laminate structure of film and fiber reinforced resin | 0° flexure | | 90° flexure | | Drop impact (J/mm) |
|---|---|---|---|---|---|---|---|---|---|
| | | | | | Strength (kg/mm$^2$) | Modulus (kg/mm$^2$) | Strength (kg/mm$^2$) | Modulus (kg/mm$^2$) | |
| 10 | | polyamide fiber | | | | | | | |

Next, examples of a tubular body will be shown.

EXAMPLE 13

In the same way as in Example 6, the film A and the CF/epoxy UD prepreg were bonded one layer each.

The bonded shoot was wound five times around a stainless steel rod (mold) of a diameter of 10 mm with the fiber axis in the longitudinal direction to make a prepreg for forming a tubular body.

Next, the prepreg, an wound on the mold, was wrapped with a PET tape (thickness 25 μm) treated for release and was cured for 2 hours in a 140° C. hot air circulation typo heating apparatus. The product was taken out from the heating furnace, the PET tape was removed, and the mold was extracted to obtain a laminated tube, i.e., a molded body given a tubular shape by the lamination. The laminated tube had an inner diameter of 10 mm and an outer diameter of about 12 mm and was composed of a CF prepreg layer and a PPTA film layer alternately laminated.

Comparative Example 11 and 12

Instead of the film A, use was made of Capton 100H (phonetic) and Upilex-20R (phonetic) and laminated tubes with inner diameters of 10 mm and outer diameters of about 12 mm were made by the same method as in Example 13.

The physical proportion of the laminated tubes of Example 13 and Comparative Examples 11 and 12 and the CF/epoxy (0° lamination) tube made in Comparative Example 2 are shown in Table 7.

The results of Table 7 show clearly that the fact that the physical properties of the film most the requirements of the prevent invention has good effects.

That is, a reinforcement effect in a direction orthogonal to the fibers is obtained, the rigidity of the tube in the same direction is increased, the flexural properties are remarkably improved, and, also, even the strength in the fiber direction is vastly increased. This is only obtained in the examples of the present invention.

Further, despite the fact that the impact resistance is a physical property of an opposite tendency from the technical idea of an interleaf, a large Izod impact strength can be obtained.

EXAMPLE 14

A prepreg comprising the film A coated on one side with an epoxy resin, made in Example 1, was alit in widths of 10 mm to make a tape. A CF. prepreg was wound four times around a stainless steel rod of a diameter of 10 mm so that the fiber axis was in the longitudinal direction. On top of this, the tape comprising the film A coated with epoxy was wound under the same conditions as the method shown in Example 3 using a wrapping machine at a pitch of 2.5 mm and a tension of 15 kg/mm$^2$, to make a prepreg comprising eight layers of the film A bonded to the outside of the CF/epoxy layer.

Next, this prepreg, as wound around the mold, was wrapped with a PET tape (thickness 25 μm) treated for release and cured for 2 hours in a 140° C. hot air circulation typo heating apparatus. The product was taken out from the heating furnace, the PET tape was removed, and the sold was extracted to obtain a laminated tube. This laminated tube had an inner diameter of 10 mm and an outer diameter of about 12 mm and consisted of the film layer bonded to the outside of the CF prepreg layer.

Comparative Examples 13 and 14

Instead of the film A, Capton 100H (phonetic) and Upilex-20R (phonetic) were used, epoxy resin (#7714 made by Asahi Fiberlight) was coated under the same conditions as in Example 1, then the result was slit to make a tape of a width of 10 mm. Aside from the use of this tape, the same method as in Example 14 was used to make the tubular body.

Table 8 shows the physical properties of the laminated tubes of Examples 14 and Comparative Examples 13 and 14 and the CF/epoxy (0° lamination) tube make in Comparative Example 2.

As understood from Table 9 too, the prevent invention is based on an idea completely different from the interleaf art.

That is, the film does not necessarily have to be laminated alternately with the fiber-reinforced resin layer. In particular, in a tubular body, the above-mentioned lamination structure can be used effectively.

Further, the face that remarkable effects are obtained by the construction of the present invention, including impact resistance is clear from the examples and comparative examples shown in Table 8.

TABLE 7

Physical Properties of Tubular Body Composed
of Film and CF Reinforced Epoxy Resin Laminated Alternately

| | Film | Axial compressive strength (kg/mm$^2$) | Face compressive strength (kg/mm$^2$) | Three-point flexure Strength (kg/mm$^2$) | Modulus (kg/mm$^2$) | Izod impact (kg · cm/cm$^2$) |
|---|---|---|---|---|---|---|
| Ex. 13 | 20 μm PPTA film | 59.8 | 20.9 | 17.8 | 1410 | 240 |
| Comp. Ex. 11 | Capton 100H | 38.7 | 12.5 | 13.1 | 1100 | 232 |
| Comp. Ex. 12 | Upilex 20R | 47.2 | 16.2 | 14.0 | 1180 | 257 |
| Comp. Ex. 2 | None | 54.9 | 9.6 | 10.2 | 530 | 154 |

TABLE 8

Physical Properties of Tubular Body Composed of Film
Laminated to Outer Layer of CF Reinforced Epoxy Resin

| | Film | Axial compressive strength (kg/mm$^2$) | Face compressive strength (kg/mm$^2$) | Three-point flexure Strength (kg/mm$^2$) | Modulus (kg/mm$^2$) | Izod impact (kg · cm/cm$^2$) |
|---|---|---|---|---|---|---|
| Ex. 14 | 20 μm PPTA film | 63.9 | 33.1 | 18.4 | 1680 | 263 |
| Comp. Ex. 13 | Capton 100H | 54.6 | 21.2 | 14.7 | 1310 | 245 |
| Comp. Ex. 14 | Upilex 20R | 50.2 | 23.6 | 15.0 | 1290 | 237 |
| Comp. Ex. 2 | None | 54.9 | 9.6 | 10.2 | 530 | 154 |

EXAMPLE 15

A carbon fiber UD shoot/PPS (product name Ryton ACM (phonetic)) preheated to 150° C. was wound four times around a stainless steel rod shaped mold of a diameter of 10 mm using a sheet rolling apparatus with the direction of orientation of the carbon fibers coinciding with the longitudinal direction of the mold. On top of this was wrapped two times the 10 mm width tape-like prepreg obtained in Example 4 using a taping machine at a pitch of 2.5 mm and a tension of 12 kg. The two ends of the laminate were firmly gripped by a stainless steel collar, then the assembly was heated in a 350° C. oven for 10 minutes. This was cooled to room temperature, then the mold was withdrawn and a laminated tube with an inner diameter of 10 mm and an outer diameter of about 12 mm was obtained.

Comparative Example 15

Instead of the film A, use was made of Upilex-20R (phonetic) and a film bonded with PPS made by the method of Example 4. The same method as used in Example 15 was used to obtain a laminated tube of an outer diameter of about 12 mm.

Comparative Example 16

A carbon fiber UD sheet/PPS (product name Ryton ACM (phonetic)) was wound five times about a mold of a stainless steel rod of a diameter of 10 mm under the same conditions as in Example 15, the outside was wrapped with a 15 mm width tape of the film A, the assembly was molded, then the film A at the outermost layer of the obtained tubular body was pooled off to make a sample.

The physical properties of the tubular bodies of Example 15 and Comparative Examples 15 and 16 are shown in Table 9.

TABLE 9

Physical Properties of Tubular Body Composed of Film
and CF Reinforced Thermoplastic Resin Bonded Together

| | Film | Axial compressive strength (kg/mm$^2$) | Face compressive strength (kg/mm$^2$) | Three-point flexure Strength (kg/mm$^2$) | Modulus (kg/mm$^2$) | Izod impact (kg · cm/cm$^2$) |
|---|---|---|---|---|---|---|
| Ex. 15 | 20 μm PPTA film | 55.4 | 15.2 | 14.5 | 1200 | 218 |
| Comp. Ex. 15 | Capton 100H | 48.1 | 9.3 | 11.8 | 980 | 191 |
| Comp. Ex. 16 | Upilex 20R | 47.1 | 7.3 | 9.2 | 490 | 157 |

Next, an explanation is made of the effects of tension in winding the film when winding a film layer on the outer layer of a fiber-reinforced resin layer to obtain a laminated tubular body, using the following example and comparative example.

EXAMPLE 16

A tape-like prepreg obtained by coating the film A on one side with epoxy resin and then slitting it to a width of 10 mm was wound at a tension of 8 kg/mm². Otherwise, the same method was used as in Example 14 to obtain a tubular body with an inner diameter of 10 mm and an outer diameter of about 12 mm.

The obtained laminated tube was cut in a direction orthogonal to the longitudinal direction and the cross-section was viewed by an electron microscope. As a result, almost no voids were observed either at the carbon fiber reinforced resin layer, the film layer, or the interface between the two.

Comparative Example 17

In the same way as in Example 16, the same method as in Example 14 was used, except that the tension was made 5 kg/mm², to obtain a laminated tube with an inner diameter of 10 mm and an outer diameter of about 12 mm.

The resultant laminated tube showed numerous voids at tho carbon fiber reinforced resin layer and the interface between the carbon fiber reinforced resin layer and the film layer. Further, the interface showed wrinkles, visible to the naked eye, along the direction of arrangement of the carbon fibers. The test piece subjected to an Izod impact test broke along the wrinkles.

The physical properties of the laminated tubes of Examples 14 and 16 and Comparative Example 17 are shown in Table 10.

TABLE 10

Physical Properties of Tubular Body Composed of Film Laminated to Outer Layer of CF Reinforced Epoxy Resin

| | Film | Axial compresive strength (kg/mm²) | Face compressive strength (kg/mm²) | Izod impact (kg · cm/cm²) |
|---|---|---|---|---|
| Ex. 14 | 20 μm PPTA film | 63.9 | 33.1 | 263 |
| Comp. Ex. 16 | Same | 60.2 | 32.8 | 254 |
| Comp. Ex. 17 | Same | 56.1 | 21.8 | 201 |

We claim:

1. A prepreg comprising at least one layer of a film comprising an organic polymer having substantially no melting point and having a tensile modulus of 700 kg/mm² or more and a tensile strength of 35 kg/mm² or more and at least one layer of a resin, said film and said resin layer being bonded to each other.

2. A prepreg according to claim 1, wherein said resin layer comprises a thermosetting resin.

3. A prepreg according to claim 1, wherein said resin layer comprises a thermoplastic resin.

4. A prepreg according to any one of claims 1 to 3, wherein a plurality of films and a plurality of resin layers are alternately bonded.

5. A prepreg according to claim 2, wherein said thermosetting resin is a resin selected from the group comprising an epoxy resin, a polyimide resin, an unsaturated polyester resin, a phenolic rosin, and a polyurethane resin.

6. A prepreg according to claim 3, wherein said thermoplastic resin is a resin selected from the group comprising a polyphenylene sulfide, a polyether ketone, a polyether ether ketone, a polyether sulfone, a polyether imide, and a polyamide imide.

7. A prepreg according to claim 1, wherein said film is a film comprising an aromatic polyamide.

8. A prepreg comprising at least one layer of a film comprising an organic polymer having substantially no melting point and having a tensile module of 700 kg/mm² or more and a tensile strength of 35 kg/mm² or more and at least one layer of a fiber-reinforced resin layer, said film and said fiber-reinforced resin layer being bonded to each other.

9. A prepreg according to claim 8, wherein a resin used in the fiber-reinforced resin layer comprises a thermosetting resin.

10. A prepreg according to claim 8, wherein a resin used in the fiber-reinforced resin layer comprises a thermoplastic resin.

11. A prepreg according to any one of claims 8 to 10, wherein at least one layer of film is laminated on an inner layer or an outer layer of at least one laminated fiber-reinforced resin layer.

12. A prepreg according to any one of claims 8 to 10, wherein the film and the fiber-reinforced resin layer are alternately laminated every other layer or every plurality of layers.

13. A prepreg according to any one of claims 8 to 10, wherein a fiber-reinforced layer reinforced by a fiber selected from the group comprising carbon fiber, glass fiber, aromatic polyamide fiber, boron fiber, alumina fiber, silicon carbide fiber, polybenzimidazole fiber, and polybenzothiazole fiber is used.

14. A prepreg according to any one of claims 8 to 10, wherein the reinforcing fibers in the fiber-reinforced resin layer consist of a unidirectionally fiber-arranged sheet.

15. A prepreg according to any one of claims 8 to 10, wherein the reinforcing fibers of the fiber-reinforced resin layer consist of a sheet selected from a group of a woven fabric, a knitted fabric, a nonwoven fabric, and a mat sheet.

16. A prepreg according to claim 8, wherein a fiber-reinforced resin layer with a thermosetting resin which is a resin selected from the group comprising an epoxy resin, a polyimide resin, an unsaturated polyester resin, a phenolic resin, and a polyurethane resin is used.

17. A prepreg according to claim 10, wherein a fiber-reinforced resin layer with a thermoplastic resin which is a resin selected from the group comprising a polyphenylene sulfide, a polyether ketone, a polyether ether ketone, a polyethyl sulfone, a polyether imide, and a polyamide imide is used.

18. A prepreg according to claim 8, wherein said film in a film comprising an aromatic polyamide.

19. A plate molded body comprising at least one layer of a film and at least one layer of a resin and/or a fiber-reinforced resin layer, wherein said film comprises an organic polymer having substantially no melting point and has a tensile module of 700 kg/mm² or more and a tensile strength of 35 kg/mm² or more, said film, said resin layer, or said fiber-reinforced resin being bonded to each other.

20. A plate molded body according to claim 19, wherein a resin used in the resin layer and fiber-reinforced resin layer comprises a thermosetting resin.

21. A plate molded body according to claim 19, wherein a resin used in the resin layer and fiber-reinforced resin layer consists of a thermoplastic resin.

22. A plate molded body according to claim 20, wherein the thermosetting resin is a resin selected from a group comprising an epoxy resin, a polyimide resin, an unsaturated polyester resin, a phenolic resin, and a polyurethane resin.

23. A plate molded body according to claim 21, wherein the thermoplastic resin is a resin selected from a group comprising a polyphenylene sulfide, a polyether ketone, a polyether other ketone, a polyethyl sulfone, a polyether imide, and a polyamide imide.

24. A plate molded body according to any one of claims 19 to 21, wherein at least one layer of film is laminated on an inner layer or an outer layer of the at least one laminated fiber-reinforced resin layers.

25. A plate molded body according to any one of claims 19 to 21, wherein the film and the fiber-reinforced resin layer are alternately laminated every other layer or every plurality of layers.

26. A plate molded body according to any one of claims 19 to 21, wherein a fiber-reinforced layer reinforced by a fiber selected from a group comprising carbon fiber, glass fiber, aromatic polyamide fiber, boron fiber, alumina fiber, silicon carbide fiber, polybenzimidazole fiber, and polybenzothiazole fiber is used.

27. A plate molded body according to any one of claims 19 to 21, wherein the reinforcing fibers in the fiber-reinforced resin layer consist of a unidirectionally fiber-arranged sheet.

28. A plate molded body according to any one of claims 19 to 21, wherein the reinforcing fibers of the fiber-reinforced resin layer consist of a sheet selected from a group of a woven fabric, a knitted fabric, a nonwoven fabric, and a mat sheet.

29. A plate molded body according to claim 19 wherein said film in a film comprising an aromatic polyamide.

* * * * *

UNITED STATES PATENT AND TRADEMARK OFFICE
CERTIFICATE OF CORRECTION

PATENT NO.: 5,770,313

DATED: June 23, 1998

INVENTOR(S): Goro Furumoto, Takashi Fujiwara and Tsunneo Igarashi

It is certified that an error appears in the above-identified patent and that said Letters Patent is hereby corrected as shown below:

Claim 23, Col. 31, Line 17, "other" should read --ether--.

Claim 29, Col. 32, Line 21, "in" should read --is--.

Title page, Col. 1 under "Foreign Application Priority Data", Item [30], Line 6, "Jan. 25, 1990" should read --Jan. 25, 1989--.

Signed and Sealed this

Twenty-fifth Day of May, 1999

Attest:

Q. TODD DICKINSON

*Attesting Officer*　　　*Acting Commissioner of Patents and Trademarks*